(12) United States Patent
Kim et al.

(10) Patent No.: US 8,999,564 B2
(45) Date of Patent: Apr. 7, 2015

(54) SECONDARY BATTERY

(75) Inventors: Ik-Kyu Kim, Yongin-si (KR);
Seok-Joon Yoon, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 535 days.

(21) Appl. No.: 13/083,030

(22) Filed: Apr. 8, 2011

(65) Prior Publication Data
US 2012/0094169 A1 Apr. 19, 2012

(30) Foreign Application Priority Data

Oct. 13, 2010 (KR) ........................ 10-2010-0099837

(51) Int. Cl.
*H01M 2/08* (2006.01)
*H01M 2/04* (2006.01)
*H01M 2/02* (2006.01)

(52) U.S. Cl.
CPC .......... *H01M 2/0413* (2013.01); *H01M 2/0285* (2013.01); *H01M 2002/0297* (2013.01)

(58) Field of Classification Search
USPC ......................................... 429/171–174, 185
See application file for complete search history.

(56) References Cited

U.S. PATENT DOCUMENTS 5,150,602 A    9/1992   Payne et al.
6,255,016 B1   7/2001   Kim
2009/0117451 A1  5/2009  Jung
2010/0119935 A1  5/2010  Kim et al.
2010/0143792 A1  6/2010  Kim

FOREIGN PATENT DOCUMENTS

KR    10-0303826 B1    11/2001
KR    100601521 B1      7/2006
KR    100696799         3/2007
KR    1020080023372    3/2008
KR    100934259        12/2009

OTHER PUBLICATIONS

Korean Office action issued by KIPO on Dec. 30, 2011, corresponding to KR 10-2010-0099837 and Request for Entry attached herewith.
Cited in Korean Notice of Allowance dated Feb. 21, 2013 issues by KIPO in connection with Korean Patent Application No. 10-2010-0099837. With Request for the Entry of the accompanying Office Action.

*Primary Examiner* — Tracy Dove
(74) *Attorney, Agent, or Firm* — Robert E. Bushnell, Esq.

(57) ABSTRACT

Disclosed is a secondary battery. The secondary battery includes an electrode assembly including a first plate, a second plate, and a separator disposed between the first and second plates, a battery case accommodating the electrode assembly and an electrolyte, a cap assembly sealing an opening formed on one side of the battery case, and a gasket disposed between the cap assembly and the battery case. The battery case includes a crimping part formed on an upper portion of the battery case, and the crimping part is disposed on the gasket. A ratio of a second thickness of the gasket to a first thickness of the gasket is greater than 1.8 and is less than 4.8. The first thickness is a length between an internal surface of the battery case and an outermost edge of the cap assembly, and the second thickness is a length between the internal surface of the battery case and an outermost tip of the crimping part.

13 Claims, 5 Drawing Sheets

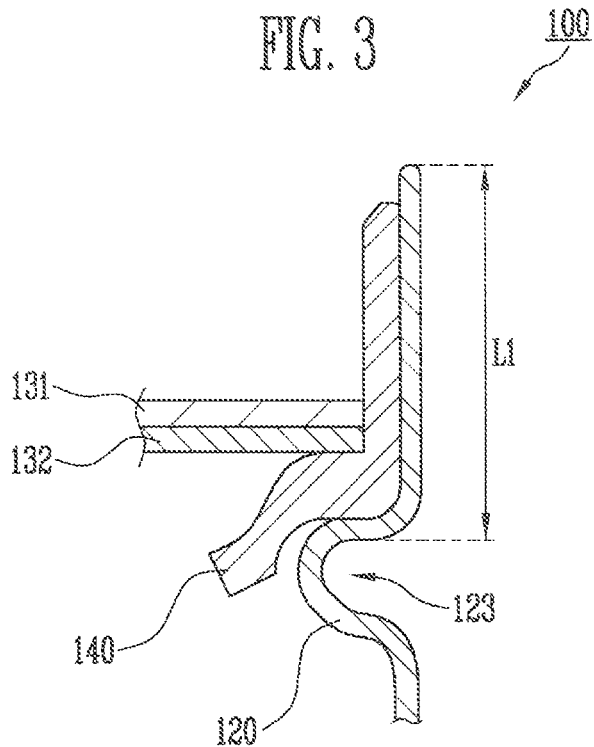
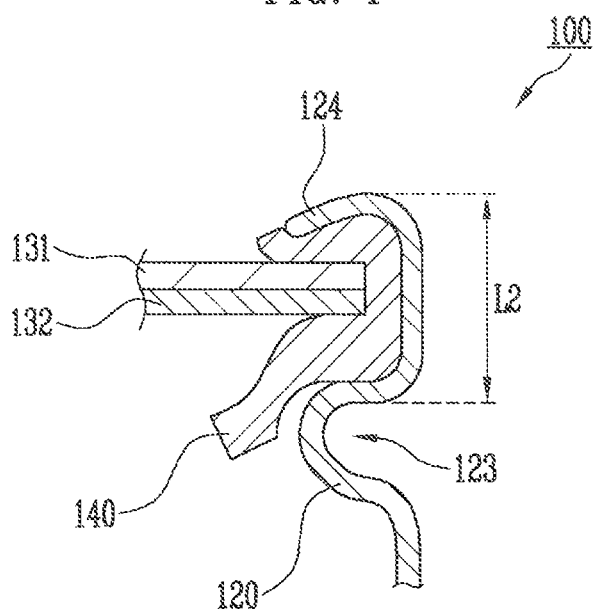

SECONDARY BATTERY

CLAIM OF PRIORITY

This application makes reference to, incorporates the same herein; and claims all benefits accruing under 35 U.S.C. §119 from an application earlier filed in the Korean Intellectual Property Office on 13 Oct. 2010 and there duly assigned Serial No. 10-2010-0099837.

BACKGROUND OF THE INVENTION

1. Field of the Invention

The embodiment relates to a secondary battery, and more particularly, to a secondary battery having improved safety.

2. Discussion of Related Art

A secondary battery is widely used for a power source of portable electronic devices. With a trend toward smaller and lighter portable electronic devices, there is a need for a smaller and lighter secondary battery.

Moreover, as the portable electronic devices are used in various fields, there is an increasing demand for a high-capacity secondary battery. Accordingly, extensive studies have been conducted to improve safety of the secondary battery with high-capacity.

SUMMARY OF THE INVENTION

An aspect of the present invention is to provide a secondary battery in which a sealing pressure of a battery case is improved regardless of the types of the battery cases.

Further, an aspect of the present invention is to provide a secondary battery which has a proper sealing pressure for high capacity and high output to improve safety.

According to an aspect of the present invention, there is provided a secondary battery including an electrode assembly having a first plate, a second plate, and a separator disposed between the first and second plates; a battery case accommodating the electrode assembly and an electrolyte where the battery case has an opening at one side and includes a crimping part formed on an upper portion of the battery case; a cap assembly sealing the opening of the battery case; and a gasket disposed between the cap assembly and the battery case. A ratio of a second thickness of the gasket to a first thickness of the gasket is greater than 1.8 and is less than 4.8. The first thickness is a length between an internal surface of the battery case and an outermost edge of the cap assembly, and the second thickness is a length between the internal surface of the battery case and an outermost tip of the crimping part.

The first thickness may be greater than or equal to 0.3 mm and is less than 1.0 mm. The first thickness may preferably be greater than or equal to 0.4 mm and is less than or equal to 0.8 mm.

The second thickness may be greater than or equal to 1.5 mm and is less than or equal to 1.9 mm.

The battery case may include a beading part formed on a side wall of the battery case. The beading part is curved inwards and supports the cap assembly. The outermost edge of the cap assembly may be disposed between the crimping part and the beading part. The gasket may be disposed between the crimping part and the beading part. The gasket may enclose the outermost edge of the cap assembly.

The crimping part may be bent towards the cap assembly to press the cap assembly. The gasket may be disposed between the cap assembly and the crimping part.

A sealing pressure of the secondary battery may be greater than or equal to 10 kgf/cm$^2$ and less than 30 kgf/cm$^2$.

As described above, according to exemplary embodiments of the present invention, a secondary battery has an improved sealing pressure to be safely used in high-current and high-voltage conditions.

Moreover, the second battery is improved in sealing pressure regardless of a battery case to be widely used.

In addition, the secondary battery is improved in sealing pressure by an easy method to enhance manufacturing efficiency and productivity.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is an enlarged view of a portion A of FIG. 2 before a crimping part is formed;

FIG. 4 is an enlarged view of the portion A on one lateral side of FIG. 2;

DETAILED DESCRIPTION OF THE INVENTION

Figure 1:
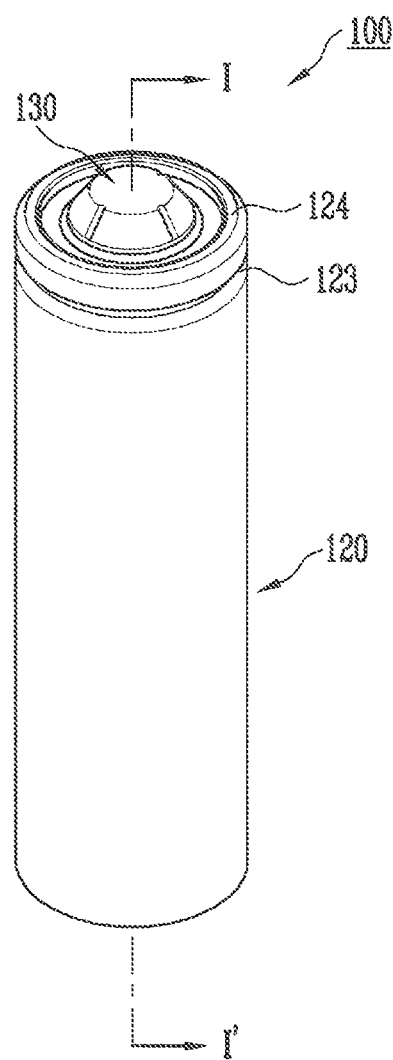
FIG. 1 is a perspective view of a secondary battery according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Figure 2:
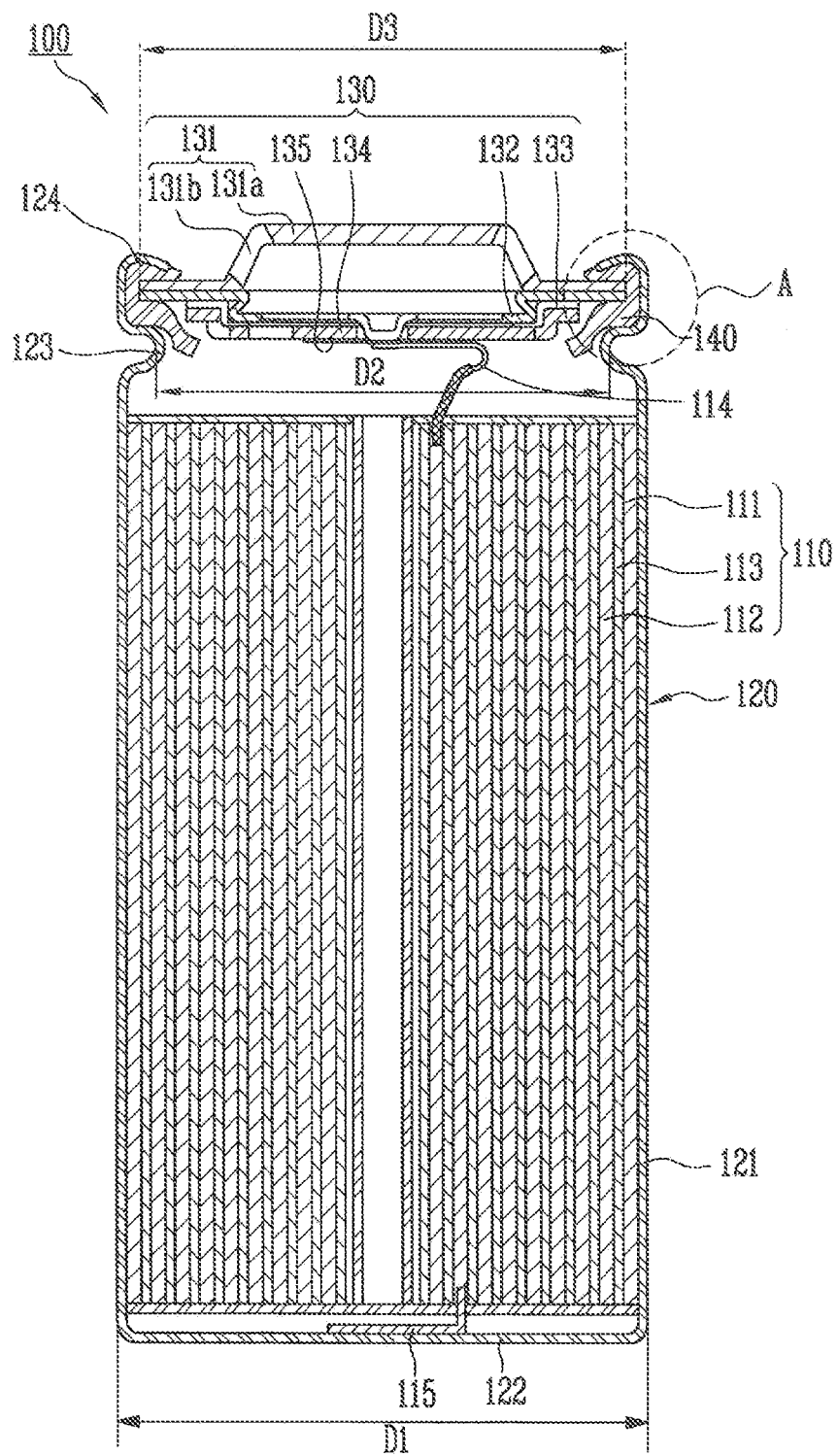
FIG. 2 is a schematic cross-sectional view taken along a line I-I' of FIG. 1.

FIG. 1 is a perspective view of a secondary battery according to an exemplary embodiment of the present invention, and FIG. 2 is a schematic cross-sectional view taken along a line I-I' of FIG. 1.

Referring to FIGS. 1 and 2, a secondary battery 100 according to the present embodiment includes an electrode assembly 110 including a first plate 111, a second plate 112, and a separator 113 disposed between the plates 111 and 112, a battery case 120 accommodating the electrode assembly 110 and an electrolyte (not shown) and having an opening at one side, a cap assembly 130 sealing the opening of the battery case 120, and a gasket 140 disposed between the cap assembly 130 and the battery case 120.

In the secondary battery 100 of the present embodiment, a thickness ratio of a thickness of a second part of the gasket 140 to a thickness of a first part thereof in a direction intersecting with a lengthwise direction of the battery case 120 may be greater than 1.8 and less than 4.8, the first part being disposed between an external surface of the cap assembly 130 and an internal surface of the battery case 120, and the second part being between the internal surface of the battery case 120 and a bent front end of a crimping unit 124.

The thickness of the first part of the gasket 140 disposed between the external surface of the cap assembly 130 and the inner surface of the battery case 120 may be greater than or equal to 0.3 mm and less than 1.0 mm. Alternatively, the thickness of the first part may preferably be greater than or equal to about 0.4 mm less than or equal to about 0.8 mm. Further, the thickness of the second part of the gasket 140 disposed between the internal surface of the battery case 120 and the bent front end of the crimping unit 124 may be greater than or equal to 1.5 mm and less than or equal to 1.9 mm.

Referring to FIG. 2, the electrode assembly 110 includes the first plate 111, the second plate 112, and the separator 113 disposed between the first plate 111 and the second plate 112. The first plate 111 and the second plate 112 include a first electrode tab 114 and a second electrode tab 115, respectively. The electrode assembly 110 is electrically connected to an external circuit (or device) through the first electrode tab 114 and the second electrode tab 115, which are attached to the first plate 111 and the second plate 112, respectively. Hereinafter, for convenience, the first plate 111 is referred to as a positive plate, and the second plate 112 is referred to as a negative plate. The electrode assembly 110 produces electricity.

The positive plate 111 may include a coating part, which includes a positive active material layer formed by a positive active material, and a non-coating part, which does not include the positive active material. The coating part of the positive plate 111 includes a positive current collector, and the positive active material layer is formed on the positive current collector. The positive active material layer may include lithium. The negative plate 112 may include a coating part, which includes a negative active material layer formed by a negative active material, and a non-coating part, which does not include the negative active material. The coating part of the negative plate 112 includes a negative current collector, and the negative active material layer is formed on the negative current collector. The negative active material layer may include graphite.

The separator 113 is disposed between the positive plate 111 and the negative plate 112 to prevent a short circuit between the positive plate 111 and the negative plate 112, which may be caused by a direct contact between the positive plate 111 and the negative plate 112. Generally, the separator 113 is an insulating thin film having high ion permeability and high mechanical strength.

The electrolyte includes lithium salts and a non-aqueous organic solvent, and may further include an additive to improve charging and discharging characteristics, to prevent overcharging, or the like. The lithium salts function as a supply of lithium ions in the battery to enable a basic operation of the lithium battery. The non-aqueous organic solvent serves as a medium to transfer ions involved in an electrochemical reaction of the battery.

The electrode assembly 110 may be formed by winding a stack of the positive plate 111, the negative plate 112, and the separator 113 disposed between the plates 111 and 112. The electrode assembly 110 is accommodated along with the electrolyte in the battery case 120. For example, the battery case 120 may be a cylindrical can.

In the present embodiment, the battery case 120 may have a shape of a cylindrical can, and the cylindrical can 120 may be formed by deep drawing of a conductive metal. Here, the conductive metal forming the cylindrical can 120 may, for example, include stainless steel, steel, aluminum, or the like. The cylindrical can 120 may preferably have a thickness of 0.1 mm to 1.0 mm.

The cylindrical can 120 includes a side wall 121 and a bottom plate 122. The side wall 121 is a cylindrical body having a regular external diameter D1 to form a space, in which the electrode assembly 110 is accommodated. The bottom plate 122 seals a bottom opening of the cylindrical can 120.

The cylindrical can 120 includes a beading part 123 formed in an upper portion of the cylindrical can 120. The beading part 123 has a curved shape recessed towards an inside of the cylindrical can 120. A portion of the cylindrical can 120, above the beading part 123 towards the upper opening, is referred to as an upper part of the cylindrical can 120, and a portion of the cylindrical can 120, below the beading part 123 towards the bottom plate 122, is referred to as a lower part of the cylindrical can 120. The beading part 123 may be formed to prevent the movement of the electrode assembly 110, and to firmly couple the cap assembly 130 in the cylindrical can 120. Thus, an external diameter D3 of the cap assembly 130 is smaller than the external diameter D1 of the cylindrical can 120, and is greater than an external diameter D2 of the portion of the cylindrical can 120, in which the beading part 123 is formed. The external diameter D2 is a diameter of the beading part portion of the cylindrical can 120.

Figure 5:
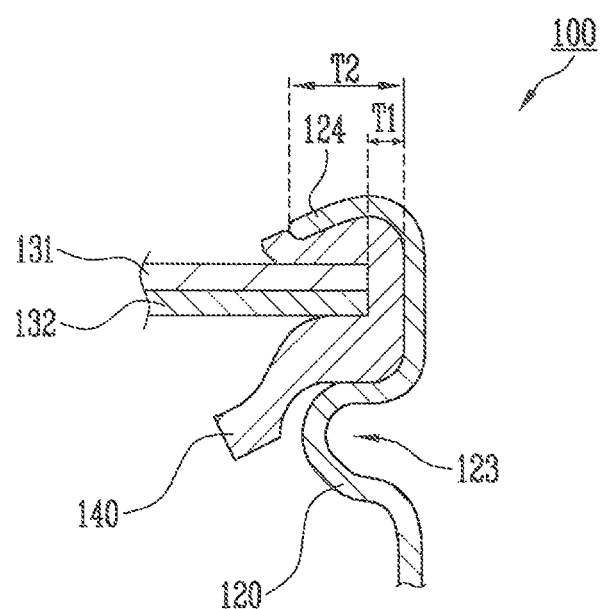
FIG. 5 an enlarged view of the portion A on another lateral side of FIG. 2.

The cylindrical can 120 may further include a crimping part 124 formed in an uppermost portion of the upper part of the cylindrical can 120 to fix the cap assembly 130 in the cylindrical can 120. The crimping part 124 is disposed on the gasket 140, and holds the gasket 140 and presses the cap assembly 130 downwards as shown in FIG. 2. The crimping part 124 serves to prevent detachment of the cap assembly 130 and leakage of the electrolyte. As shown in FIGS. 2, 4 and 5, the crimping part 124 is bent inwards (towards the cap assembly 130) to hold the gasket 140 and the outermost edge of the cap assembly 130. The crimping part 124 refers to the bent portion of the cylindrical can 120. A length between the beading part 123 and the crimping part 124 is referred to as an occlusion length L2 as shown in FIG. 4.

The cap assembly 130 may include an upper cap 131 and a safety vent 132. The cap assembly 130 may further include a lower cap 134, an insulating member 133, and a sub-plate 135.

The upper cap 131 is a round plate having a terminal part 131a, which is formed in a middle portion of the upper cap 131 and projecting outwards. The terminal part 131a is used for electrical connection to an external circuit or device. An edge portion of the upper cap 131 extends into the gasket 140 as shown in FIG. 2. The terminal part 131a (middle portion of the upper cap 131) projects outwards from the edge portion of the upper cap 131. A plurality of gas discharge holes 131b are formed between the terminal part 131a and the edge portion of the upper cap 131, and serve as a path to discharge gas generated inside the cylindrical can 120.

The safety vent 132 is installed to be closely attached to a lower surface of the upper cap 131. The safety vent 132 is deformed or ruptured to perform insulation or to discharge gas to the outside when an internal pressure of the cylindrical can 120 increases. The safety vent 132 is combined with the upper cap 131, and is seated inside the gasket 140. The gasket 140 firmly holds a circumferential surface of the combined layers of the upper cap 131 and the safety vent 132. The edges of the circumferential surface of the upper cap 131 and the safety vent 132 may be referred to as an outermost edge of the cap assembly 130. Generally, the outermost edge of the cap assembly 130 is referred to as the portion of the cap assembly 130 that is coupled to the gasket 140.

The insulating member 133 is disposed between the safety vent 132 and the lower cap 134, and is formed of a material electrically insulating the safety vent 132 from the lower cap 134. The sub-plate 135 is fixed to a lower surface of the lower cap 134, and is welded to the safety vent 132.

The gasket 140 is substantially ring-shaped and is disposed in an upper part of the cylindrical can 120. The location of the gasket 140 may be adjusted based on the thickness of the cylindrical can 120, a material of the beading part 123, a material of the gasket 140, or the like. For example, the gasket 140 functions to electrically insulate the cap assembly 130 connected to the first electrode tab 114, which may have positive polarity, from the cylindrical can 120 connected to the second electrode tab 115, which may have negative polarity. Further, the gasket 140 secures coupling of the cap assembly 130 with the cylindrical can 120 to improve sealing the secondary battery 100. Accordingly, any leak of fluid such as electrolyte is prevented by the gasket 140. Thus, the material of the gasket 140 is not limited as long as the material has electrically insulating and sealing properties. For example, the gasket 140 may be formed of a polypropylene-based material, which facilitates mounting the gasket 140 and absorbs an external impact to protect the cap assembly 130.

The gasket 140 may be disposed in the upper part of the cylindrical can 120, which is above the beading part 123 curved inwards. Thus, the gasket 140 is spaced away from the electrode assembly 110 accommodated in the cylindrical can 120, and the beading part 123 is positioned between the gasket 140 and the electrode assembly 110.

Further, the safety of the secondary battery 100 is improved as a sealing pressure (a degree of a seal) increases. Herein, the sealing pressure indicates how securely the secondary battery 100 is sealed. In other words, higher sealing pressure is desirable to improve the quality of the secondary battery 100. The sealing pressure may be determined by combinations of various factors. Major factors may include a length of the upper part of the cylindrical can 120 (length L1 shown in FIG. 3), the occlusion length L2 (FIGS. 2 and 4), the external diameter D3 of the cap assembly 130, and the like. Hereinafter, the length L1 of the upper part of the cylindrical can 120, the occlusion length L2, and the external diameter D3 of the cap assembly 130 will be described.

FIG. 3 is an enlarged view of a portion A of FIG. 2 before the crimping part is formed.

Referring to FIG. 3, the cylindrical can 120 may include the beading part 123, to the opening, curved inwards and supporting the upper cap 131 and the safety vent 132 (outermost edge of the cap assembly 130). Further, the gasket 140 may be disposed on the beading part 123 to be coupled to the cap assembly 130. The length L1 of the upper part of the cylindrical can 120 may be determined by a position of the beading part 123. The longer the length L1 of the upper part of the cylindrical can 120 is, the more securely the cap assembly 130 is fixed. Thus, as the length L1 of the upper part of the cylindrical can 120 increases, the sealing pressure of the secondary battery 100 rises.

FIGS. 4 and 5 are an enlarged view of the portion A of FIG. 2.

Referring to FIG. 4, the cylindrical can 120 may further include the crimping part 124 in an upper portion of the upper part of the cylindrical can 120 to fix the cap assembly 130. The gasket 140 is disposed in a space, which is covered by the crimping part 124 and is formed between the cylindrical can 120 and the cap assembly 130. The crimping part 124 holds an edge portion of the cap assembly 130. That is, the crimping part 124 may be formed using a crimping jig to press the crimping part 124 onto the gasket 140. Referring to FIG. 3, the cap assembly 130 is placed on the gasket 140, which is disposed on the beading part 123. The uppermost portion of the upper part of the cylindrical can 120 is formed into the crimping part 124 when the uppermost portion is bent over. Referring to FIG. 4, the uppermost portion is bent pressing the gasket 140. The crimping part 124 is the bent portion of the upper part of the cylindrical can 120, and firmly holds the edge portions of the upper cap 131 and the safety vent 132 that are coupled to the gasket 140 to improve a sealing performance of the secondary battery 100. The uppermost portion of the upper part of the cylindrical can 120 is referred to as an outermost tip of the crimping part 124. As shown in FIG. 4, the outermost tip of the crimping part is bent towards the cap assembly 130 to press the edge portion of the cap assembly 130.

In the secondary battery 100 formed with the crimping part 124, a portion between the beading part 123 and the crimping part 124 is the occlusion length L2. The occlusion length L2 may be changed depending on thicknesses of the upper cap 131 and the safety vent 132, a thickness of the cylindrical can 120, and a thickness of a portion of the gasket 140 interposed between the edge of the upper cap 131 and the cylindrical can 120.

Generally, the thicknesses of the upper cap 131 and the safety vent 132 and the thickness of the cylindrical can 120 may not dramatically change depending on types of secondary batteries. When the thickness of the cap assembly 130 and the thickness of the cylindrical can 120 are less than a predetermined value, another safety issue may occur. Thus, the occlusion length L2 may be mainly determined by how much the gasket 140 is compressed and by the applied pressure to form the crimping part 124.

As the extent to which the gasket 140 is compressed is greater, the sealing pressure increases. Thus, in order to increase the extent to which the gasket 140 is compressed, the pressure to form the crimping part 124 is increased. If the extent to which the gasket 140 is compressed is greater, the occlusion length L2 decreases. That is, as the occlusion length L2 is smaller, the sealing pressure increases.

Since the occlusion length L2 may be determined by a size of the gasket 140, the adjustment of the occlusion length L2 is limited at the given size of the gasket 140. Moreover, if a pressure higher than a predetermined pressure is applied to the gasket 140, the gasket 140 may be damaged, and thus a pressure applied to the gasket 140 should be controlled.

Referring to FIG. 5, a method and a structure for improving the sealing pressure of the secondary battery 100 by the external diameter D3 of the cap assembly 130 is described.

The gasket 140 is tightly disposed between the outermost edge of the cap assembly 130 and the inner surface of the battery case (cylindrical can) 120. A length of the gasket 140 between the outermost edge of the cap assembly 130 and the internal surface of the cylindrical can 120 is referred to a first thickness T1. The portion of the gasket 140 positioned within this first thickness T1 is referred to a first part of the gasket 140. Therefore, the first thickness T1 may be referred to as a thickness T1 of the first part of the gasket 140. The first thickness T1 of the first part may be greater than or equal to 0.3 mm, and is less than 1.0 mm. The first thickness T1 may preferably be greater than or equal to about 0.4 mm, and may preferably be less than or equal to about 0.8 mm. When the first thickness T1 is not uniform, the first thickness T1 is defined as the minimum thickness of the first part.

In the secondary battery 100 of the present embodiment, at the given external diameter D1 of the cylindrical can 120, if the external diameter D3 of the cap assembly 130 increases, the first thickness T1 of the first part relatively decreases. That is, an interval between the inner surface of the cylindrical can 120 and the outermost edge of the cap assembly 130 facing the inner surface of the cylindrical can 120 becomes narrower. Also, when the first thickness T1 of the first part decreases, an overall volume for sealing the secondary battery 100 decreases, and therefore, the sealing pressure of the secondary battery 100 is improved.

As the external diameter D3 of the cap assembly 130 becomes larger, the outermost edge of the cap assembly 130 may be inserted deeper into the space, which is located between the beading part 123 and the crimping part 124, and thus the cap assembly 130 may be more securely fixed by the crimping part 124. Accordingly, when the external diameter D3 of the cap assembly 130 increases, the sealing pressure of the secondary battery 100 according to the present invention is improved.

When the first thickness T1 of the first part of the gasket 140 disposed between the cap assembly 130 and the cylindrical can 120 is less than about 0.3 mm, elasticity of the gasket 140 is reduced, and the gasket 140 is not properly attached to an end portion of the external surface of the cap assembly 130. Thus, the durability of the gasket 140 decreases and the capability of packing the cylindrical can 120 also decreases, and as a result, the sealing pressure of the secondary battery 100 may be reduced. When the first thickness T1 of the first part is greater than or equal to about 1.0 mm, the thickness of the gasket 140 has less effect for decreasing the first thickness T1 of the first part as compared with a thickness of a generally used gasket, thickness of which is greater than or equal to about 1.0 mm and less than or equal to about 1.5 mm.

The first thickness T1 of the first part may preferably be greater than or equal to about 0.4 mm and may be less than or equal to about 0.8 mm. When the thickness T1 of the first part is less than 0.4 mm, the gasket 140 may have a crack when the crimping part 124 is formed in the cylindrical can 120. When the thickness T1 of the first part is more than 0.8 mm, the occlusion length L2 increases due to the interposed gasket 140. That is, in the secondary battery 100, when a length from a bottom side of the secondary battery 100 to the top of the cap assembly 130 is defined as a total height, and a length from the bottom side of the secondary battery 100 to the crimping part 124 is defined as a withers height, the withers height may be larger than the total height.

The cap assembly 130 functions as an electrode terminal for electrical connection of the secondary battery 100 to an external electronic device. However, when the withers height is larger than the total height, there may be a problem in the electrical connection of the secondary battery 100 to the external electronic device due to interference by the neighboring crimping part 124.

In the gasket 140, the first thickness T1 of the first part may be relatively smaller than a thickness of other portions of the gasket 140. The gasket 140 may affect not only the sealing pressure of the secondary battery 100 but also the safety of the secondary battery 100, and thus the other portions of the gasket 140 may preferably have a regular thickness. For example, a portion of the gasket 140 pressed by the crimping part 124 on the external surface of the cap assembly 130 may melt when the secondary battery 100 is heated.

The thickness of the cylindrical can 120 contacting the first part may be in a range of about 0.1 mm to about 1.0 mm. When the thickness of the cylindrical can 120 is less than 0.1 mm, the cylindrical can 120 may be damaged due to the internal pressure of the secondary battery 100 or a high temperature by an abnormal reaction between the electrode assembly and the electrolyte. When the thickness of the cylindrical can 120 is greater than 1.0 mm, it is difficult to control a process of forming the beading part 123 or the crimping part 124 from the cylindrical can 120. Further, the volume and weight of the secondary battery 100 increase.

FIG. 5 shows the second part of the gasket 140 formed between the inner surface of the cylindrical can 120 and the outermost tip of the crimping part 124. The thickness of the second part of the gasket 140 is referred as a second thickness T2 of the second part. The second thickness T2 is a thickness of the gasket 140 between the inner surface of the cylindrical can 120 and the outermost tip of the crimpling part 124 as shown in FIG. 5. The second thickness T2 of the second part may be greater than or equal to 1.5 mm and may be less than or equal to 1.9 mm. When the second thickness T2 of the second part is less than 1.5 mm, pressure of the crimping part 124 applied to the cap assembly 130 decreases. Even worse, the cap assembly 130 may be easily ruptured due to an increase of the internal pressure of the secondary battery 100. When the second thickness T2 of the second part is greater than 1.9 mm, the crimping part 124 has an increased curvature. Thus, the cap assembly 130 of the secondary battery may be positioned in a lower position than the highest portion of the crimping part 124, which may interrupt the electrical connection to the external electronic device.

The second thickness T2 of the second part is indirectly affected by the length L1 of the beading part 123 (FIG. 3), and the occlusion length L2 (FIG. 4), which improve the sealing pressure as described above.

Figure 6:
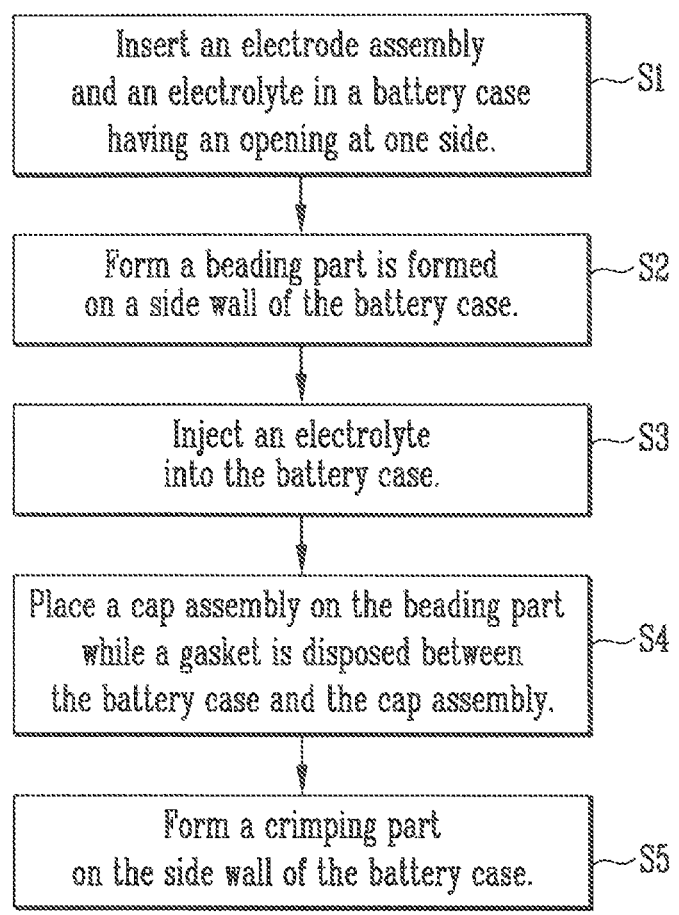
FIG. 6 is a flowchart showing the manufacturing process of the secondary battery according to an exemplary embodiment of the present invention.

Referring to FIG. 6, a cylindrical secondary battery according to the present embodiment may be manufactured by the following processes.

(S1) An electrode assembly and an electrolyte is accommodated in a battery case having an opening at one side.

(S2) A beading part is formed on a side wall of the battery case. The beading part is formed upper portion of the side wall near the opening of the battery case.

(S3) The electrolyte is injected into the battery case.

(S4) The cap assembly is placed on the beading part while a gasket is disposed on the outermost edge of the cap assembly. The gasket is positioned between the outermost edge of the cap assembly and the inner surface of the battery case.

(S5) A crimping part is formed at an upper side of the cap assembly.

Referring to FIG. 2, a method of the secondary battery according to the present embodiment is described. The battery case 120 may include a cylindrical can. Hereinafter, the battery case 120 is described as the cylindrical can 120, but is not limited thereto.

In the process S1, the electrode assembly 110 is accommodated in the cylindrical can 120. The cylindrical can 120 may have the opening at one side. The electrode assembly 110 is inserted through the opening.

In the process S2, the beading part 123 is formed on the upper portion of the side wall 121 of the cylindrical can 120, which is closer to the opening of the cylindrical can 120. The cylindrical can 120 is formed with the beading part 123 through a beading process. The beading part 123 has a shape curved inwards from the side wall 121 of the cylindrical can 120.

In the process S3, the electrolyte is injected into the cylindrical can 120. The electrolyte spreads inside the electrode assembly 110 in the cylindrical can 120.

In the process S4, the cap assembly 130 is seated on the beading part 123 while the gasket 140 is disposed at the outermost edge of the cap assembly 130. After the seating, the gasket 140 is disposed between the outermost edge of the cap assembly 130 and the inner surface of the cylindrical can 120. The cylindrical can 120 is connected to the second electrode tab 115 of the electrode assembly 110, and the cap assembly 130 is connected to the first electrode tab 114, so that the cylindrical can 120 and the cap assembly 130 have different polarities. The gasket 140 prevents short-circuit between the cylindrical can 120 and the cap assembly 130. Thus, the gasket 140 may be formed of an insulating material, for example, a polypropylene-based material.

In the process S5, the crimping part 124 is formed at the upper side of the cap assembly 130. Here, the crimping part 124 presses the cap assembly 130 to prevent detachment of the cap assembly 130 and leakage of the electrolyte.

Hereinafter, exemplary embodiments of the present invention are described. However, the following embodiments are provided as illustrative examples and do not to restrict the spirit or scope of the present invention.

Example 1

A cylindrical secondary battery accommodating an electrode assembly and an electrolyte according to the present invention is manufactured. In the secondary battery, a cylindrical can, a cap assembly, and a gasket are formed as described above and shown in FIG. 2, and a crimping part is formed.

Here, in the cylindrical secondary battery, an upper portion of the secondary battery is crimped using a crimping jig so that a first thickness T1 of a first part of the gasket is 0.8 mm, and a second thickness T2 of a second part of the gasket is 1.5 mm. In order to measure the sealing pressure of this secondary battery, a round hole is formed in a lateral lower part of the cylindrical secondary, battery formed with the crimping part. A rubber packing is formed in the hole to prevent leakage of gas, and a tube to inject gas through is connected to the hole. On an upper surface of the cab assembly of the secondary battery, water is provided to a side of a discharge hole which is a path to discharge gas through in order to identify a point in time when gas is generated, and a pressure measurement apparatus is connected to the hole. Nitrogen gas is injected at 0.1 kgf/cm²/s to the secondary battery through the connected tube. While nitrogen gas is injected, a pressure is measured at the point when gas bubbles rise on the upper surface of the cab assembly of the secondary battery to measure a sealing pressure of the secondary battery.

Example 2

The same process as in Example 1 is performed to make another secondary battery except that a crimping part is formed to have the first thickness T1 of the gasket is 0.53 mm, and the second thickness T2 of the gasket is 1.6 mm. With the same processes describe in Example 1, a sealing pressure of this secondary battery is measured.

Example 3

The same process as in Example 1 is performed to make another secondary battery except that a crimping part is formed to have the first thickness T1 is 0.4 mm, and the second thickness T2 is 1.9 mm. With the same processes describe in Example 1, a sealing pressure of this secondary battery is measured.

TABLE 1

Measurement results of sealing pressure

| | Example 1 | Example 2 | Example 3 |
|---|---|---|---|
| First thickness T1 (mm) | 0.8 | 0.53 | 0.4 |
| Second thickness T2 (mm) | 1.5 | 1.6 | 1.9 |
| T2/T1 | 1.88 | 1.9 | 4.75 |
| Sealing pressure (kgf/cm²) | 10 | 20 | 29 |

In the present invention, various factors, which affect the sealing pressure of the secondary battery, are examined. Further, methods of improving the sealing pressure of the secondary battery are also examined to enhance safety of the secondary battery while not reducing performance of the secondary battery.

As described above, when the first thickness T1 is less than 0.4 mm, the gasket may have a crack. When the first thickness T1 is more than 0.8 mm, the crimping part may be formed in an upper position than the cap assembly. In addition, when the second thickness T2 is less than 1.5 mm, pressure the crimping part applied to the cap assembly decreases, so that the secondary battery may be easily ruptured. When the second thickness T2 of the second part is more than 1.9 mm, the crimping part has an increased curvature. Thus, in the examples, experiments are carried out so that the first thickness T1 of the first part and the second thickness T2 of the second part may be formed in the above ranges.

According to Examples 1 to 3 illustrated in Table 1, as a thickness ratio (T2/T1) of the second thickness T2 to the first thickness T1 increases, the sealing pressure increases.

In Example 1, the thickness ratio (T2/T1) of the second thickness T2 to the first thickness T1 is greater than 1.8, so that the secondary battery has a sealing pressure of 10 kgf/cm². In Example 2, the thickness ratio (T2/T1) of the second thickness T2 to the first thickness T1 is greater than or equal to 3.0, so that the secondary battery has a sealing pressure of 20 kgf/cm² or greater.

When the first thickness T1 and the second thickness T2 are in the proper thickness ranges, as seen from Example 3, the thickness ratio (T2/T1) of the second thickness T2 to the first thickness T1 maintains the ration less than 4.8. That is, the first thickness T1 and the second thickness T2 work together to affect the sealing pressure of the secondary battery, and thus the sealing pressure may be determined by the thickness ratio (T2/T1) of the second thickness T2 to the first thickness T1.

Thus, in the present invention, the thickness ratio (T2/T1) of the second thickness T2 to the first thickness T1 may be greater than 1.8 and less than 4.8, and accordingly the sealing pressure of the secondary battery may be greater than or equal to 10 kgf/cm² and less than 30 kgf/cm².

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and-equivalents thereof.

What is claimed is:

1. A secondary battery comprising:
   an electrode assembly comprising a first plate, a second plate, and a separator disposed between the first and second plates;
   a battery case accommodating the electrode assembly and an electrolyte, the battery case having an opening at one side;

a cap assembly sealing the opening of the battery case, the cap assembly including an upper cap that is electrically coupled to the electrode assembly, the battery case including a crimping part having an outermost tip bent towards the cap assembly; and a gasket disposed between an outermost edge of the cap assembly and an internal surface of the battery case, the crimping part being disposed on the gasket, a ratio of a second thickness of the gasket to a first thickness of the gasket being greater than 1.8 and less than 4.8, the first thickness being a length between the internal surface of the battery case and the outermost edge of the cap assembly, the second thickness being a length between the internal surface of the battery case and the outermost tip of the crimping part, an entire surface of the edge portion of the upper cap, which faces the opening and is covered by the gasket, directly contacting the gasket.

2. The secondary battery of claim 1, wherein the first thickness is greater than or equal to 0.3 mm and is less than 1.0 mm.

3. The secondary battery of claim 2, wherein the first thickness is greater than or equal to 0.4 mm and is less than or equal to 0.8 mm.

4. The secondary battery of claim 1, wherein the second thickness is greater than or equal to 1.5 mm and is less than or equal to 1.9 mm.

5. The secondary battery of claim 1, wherein the gasket is made of a material comprising a polypropylene-based material.

6. The secondary battery of claim 1, wherein the battery case comprises a beading part formed on a side wall of the battery case, the beading part being curved inwards and supporting the cap assembly.

7. The secondary battery of claim 6, wherein the outermost edge of the cap assembly is disposed between the crimping part and the beading part.

8. The secondary battery of claim 6, wherein the gasket is disposed between the crimping part and the beading part, the gasket enclosing the outermost edge of the cap assembly.

9. The secondary battery of claim 1, wherein a portion of the gasket is disposed between the cap assembly and the crimping part.

10. The secondary battery of claim 1, wherein a sealing pressure of the secondary battery is greater than or equal to 10 kgf/cm$^2$ and less than 30 kgf/cm$^2$.

11. The secondary battery of claim 1, wherein the battery case has a shape of a cylindrical can.

12. The secondary battery of claim 11, wherein the cylindrical can is formed of at least one selected from the group consisting of stainless steel, steel, and aluminum.

13. The secondary battery of claim 11, wherein the cylindrical can has a thickness of 0.1 mm to 1.0 mm.

* * * * *